(12) United States Patent
Alvizu Gomez et al.

(10) Patent No.: US 12,063,165 B2
(45) Date of Patent: Aug. 13, 2024

(54) SPECTRUM-AWARE CROSS-LAYER OPTIMIZATION

(71) Applicant: Google LLC, Mountain View, CA (US)

(72) Inventors: Rodolfo Enrique Alvizu Gomez, San Jose, CA (US); Anurag Sharma, Cupertino, CA (US); Christina Vlachou, San Francisco, CA (US); Rene Marcel Schmogrow, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 290 days.

(21) Appl. No.: 17/574,023

(22) Filed: Jan. 12, 2022

(65) Prior Publication Data

US 2023/0164091 A1   May 25, 2023

(30) Foreign Application Priority Data

Nov. 22, 2021  (GR) .............................. 20210100817

(51) Int. Cl.
*H04L 47/80*  (2022.01)
*H04B 10/079*  (2013.01)
*H04L 69/321*  (2022.01)

(52) U.S. Cl.
CPC ....... *H04L 47/805* (2013.01); *H04B 10/0795* (2013.01); *H04L 69/321* (2013.01)

(58) Field of Classification Search
CPC .. H04L 47/805; H04L 69/321; H04B 10/0795
See application file for complete search history.

(56) References Cited

U.S. PATENT DOCUMENTS

| | | | | |
|---|---|---|---|---|
| 5,933,422 | A * | 8/1999 | Kusano | H04Q 11/0478 709/239 |
| 9,961,675 | B1 * | 5/2018 | Reed | H04L 41/0896 |
| 2002/0068612 | A1 * | 6/2002 | Carey | H04W 16/06 455/562.1 |
| 2014/0233956 | A1 | 8/2014 | Zami | |

OTHER PUBLICATIONS

Boutaba et al. Elastic Optical Networking for SG Transport. Journal of Network and Systems Management, Springer US, New York, vol. 25, No. 4, Sep. 30, 2017 (Sep. 30, 2017), pp. 819-847, DOI: 10.1007/SI0922-017-9434-Z.
International Search Report and Written Opinion for International Application No. PCT/US2022/050255 dated Mar. 22, 2023. 19 pages.

* cited by examiner

*Primary Examiner* — Brenda H Pham
(74) *Attorney, Agent, or Firm* — Lerner David LLP

(57) ABSTRACT

Allocating network resources to one or more signals that are to be conveyed over the network by calculating a transport capacity for a sublink of the network based on a spectral efficiency of at least one subpath included in the sublink, and allocating the sublink to at least one signal based on the calculated transport capacity.

18 Claims, 5 Drawing Sheets

SPECTRUM-AWARE CROSS-LAYER OPTIMIZATION

CROSS-REFERENCE TO RELATED APPLICATIONS

The present application claims priority from Greek Patent Application No. 20210100817 filed Nov. 22, 2021, the disclosure of which is hereby incorporated herein by reference.

BACKGROUND

Capacity planning is an ongoing process for network service providers. Such providers regularly need to allocate network resources to be able to successfully service communications that their networks are called upon to carry. Further, such providers often need to plan for adding network resources to meet anticipated increases in network demand. To facilitate the process of resource allocation and resource addition, a provider may employ a network model. By employing a model, a network service provider may test plans for resource allocation and resource addition before the plans are implemented, thereby allowing the service provider to efficiently allocate resources and identify deficient plans using the model, and to avoid service interruptions that might occur due to implementation of a deficient plan.

BRIEF SUMMARY

It has been recognized that current network modeling suffers from the use of uniform models that are imprecise and can result in significant inaccuracies. More particularly, it has been recognized that the currently employed uniform models model networks at a level of abstraction that uses broad approximations for elements at lower levels of abstraction, and that the use of such broad approximations gives rise to significant imprecision in the resulting model and attendant inefficiencies in the allocation of network resources based on the model.

In view of the drawbacks associated with current network modeling techniques, the presently disclosed technology is provided. In the present technology, a network may be modeled at a relatively higher layer of abstraction, e.g., at a packet layer, without requiring the use of broad approximations for elements below the higher layer of abstraction, e.g., at a transport layer, by allowing for modeling of elements below the higher layer of abstraction, resulting in a more precise network model. The present technology may be said to provide a cross-layer optimization (XL optimization) technique of network modeling resource allocation, or a spectrum-aware XL optimization technique of network modeling and resource allocation.

In one aspect, the technology provides a method for allocating network resources to one or more signals that are to be conveyed over the network. The method includes calculating a transport capacity for a sublink of the network based on a spectral efficiency of at least one subpath included in the sublink; and allocating the sublink to at least one signal based on the calculated transport capacity.

In another aspect, the technology provides a network sublink. The sublink includes at least one subpath, the sublink being allocated to convey one or more signals on the network by performing an operation including calculating a transport capacity for the sublink based on a spectral efficiency of the at least one subpath and allocating the sublink to the one or more signals based on the calculated transport capacity.

In still another aspect, the technology provides a non-transitory computer-readable medium. The computer-readable medium having stored thereon a computer-readable program for performing a method for allocating network resources to convey one or more signals that are to be transmitted over the network, the method including calculating a transport capacity for at least one sublink of the network based on a spectral efficiency of at least one subpath included in the sublink; and allocating the sublink to at least one signal based on the calculated transport capacity.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
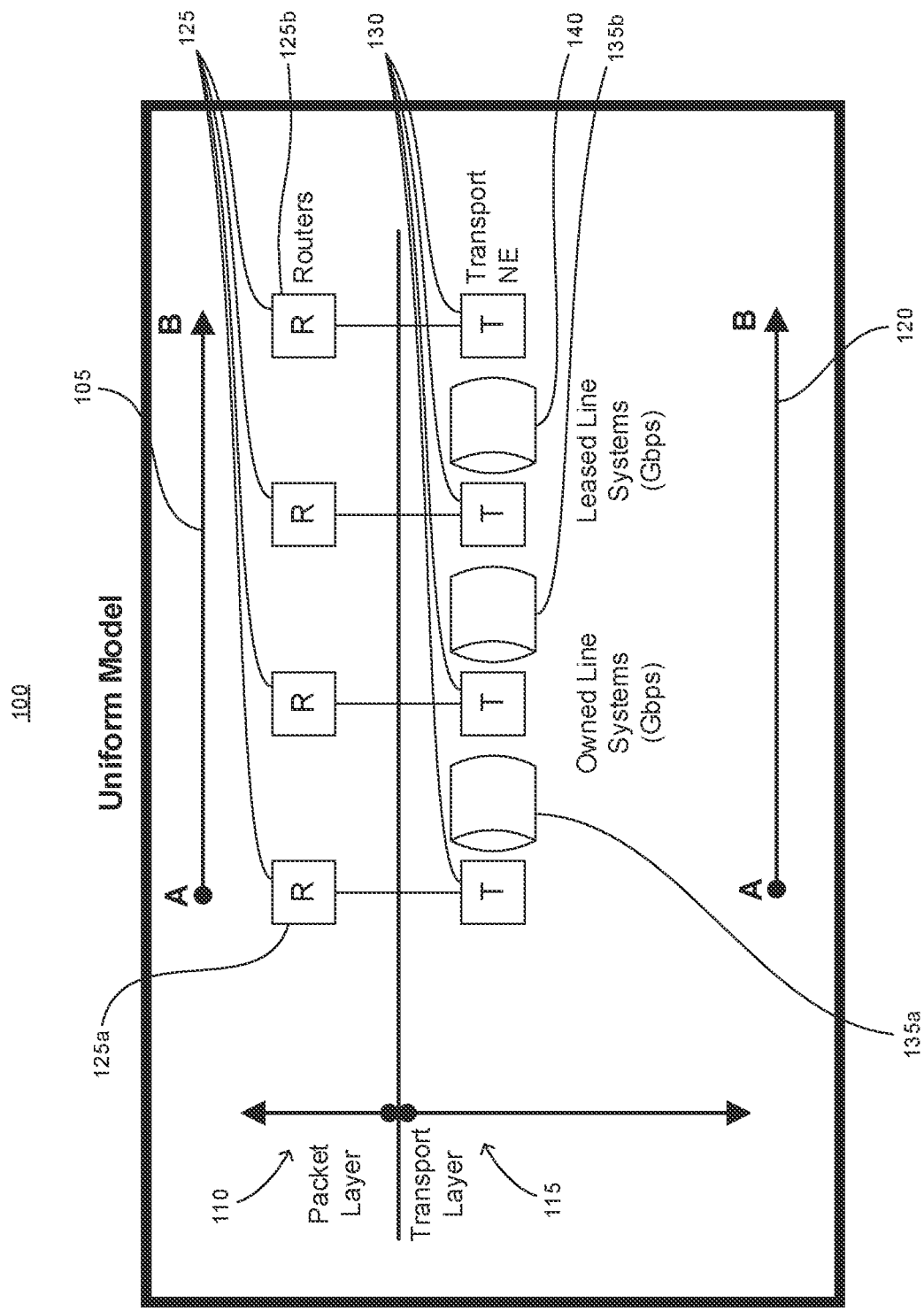
FIG. 1 is a functional block diagram illustrating how a uniform model is used to model a network link.

In order to aid in understanding the example embodiments described herein, an example of the uniform network model of the related art is described first. FIG. 1 is a functional block diagram illustrating how a uniform model 100 is used to model a network link 105. As can be seen from the figure, the network link 105 is considered at two levels of abstraction, a higher level layer, e.g., packet layer 110, and a lower level layer, e.g., a transport layer 115. The link 105 refers to a communicative coupling between two end points, e.g., endpoints A and B, as seen in the context of the higher level layer 110. A sublink 120 refers to a communicative coupling between the two endpoints, A and B, as seen in the context of the lower level layer 115. The two endpoints A and B may refer to any two points between which one or more transmissions are sent. For instance, endpoint A may be a source and endpoint B may be a destination, endpoint A may be a destination while endpoint B may be a source, or endpoints A and B may exchange bi-directional communication. For purposes of brevity, the case of A being a source and B being a destination will be described with the understanding that the alternative cases will be readily understood in view of such description.

Returning to FIG. 1, in the depicted example the link 105 corresponds to a path between router 125a and router 125b (corresponding to A and B) of routers 125, whereas the sublink 120 corresponds to a path that runs through a plurality of transport network elements 130, two owned-line systems 135a and 135b, and one leased-line system 140. The owned-line systems 135a and 135b are line systems that are owned by the entity that allocates the network resources, e.g., the network service provider. The leased line system 140 is not owned by the entity that allocates the network resources and is, for example, leased by the entity that allocates the network resources.

In allocating resources according to model 100, a signal to be conveyed over the network being modeled may be said to define a link in the higher level layer 110. For example, if it is desired to transmit a signal that conveys information at a rate of 300 Gigabits per second (Gbps), the signal may be said to be carried by link 105, with link 105 being able to support the transmission of data between routers 125a and 125b at a rate of 300 Gbps. Then, once link 105 is defined on the higher level layer 110, an operation is performed to determine network elements of the lower level layer 115 that can provide a 300 Gbps communicative coupling between points A and B. In the example, the elements of the lower level layer 115 that satisfy the requirement of link 105 are referred to collectively as sublink 120. Thus, in the example of FIG. 1, the sublink 120 is able to support the transmission of data between router 125a and 125b at a rate of 300 Gbps, and network elements 130, 135a, 135b, and 140 support the allocation of such communication. That is, in the network to which uniform model 100 is applied, network elements 130, 135a, 135b, and 140 may be used to transmit a 300 Gbps signal from point A to point B.

Notably, in the FIG. 1 example each of the owned-line systems 135 and the leased-line system 140 are abstracted as couplings that can support a given communication rate. More specifically, the owned-line systems 135a and 135b and the leased line system 140 are each assigned a transport capacity value, e.g., a Gbps value, and such value is the only parameter considered when determining whether or not to allocate the systems 135a, 135b, and 140 to service the signal transmitted from point A to point B. However, the real-world systems 135a, 135b, and 140—in actuality rather than as modeled—are not limited to the single values assigned to them in the FIG. 1 model. The real-world transmission rates that systems 135a, 135b, and 140 can support will vary according to many factors, and therefore using a single default value to model each of systems 135a, 135b, and 140 introduces a large error margin and leads to significant imprecision in the allocation of systems 135a, 135b, and 140. For instance, if the default value of transport capacity for owned-line system 135a is higher than the actual transport capacity for owned-line system 135a, owned-line system 135a might be allocated for a signal that the owned-line system 135a cannot support, resulting in an erroneous allocation plan that may fail if implemented. Further, if the default value of transport capacity for owned-line system 135a is lower than the actual transport capacity for owned-line system 135a, owned-line system 135a may not be allocated for a signal that the system can support, resulting in an allocation plan that under-utilizes owned-line system 135a.

In order to avoid the inefficiencies associated with the uniform modeling of FIG. 1, a spectrum aware XL optimization technique of network modeling is provided. An example of such modeling is described in connection with FIG. 2.

Figure 2:
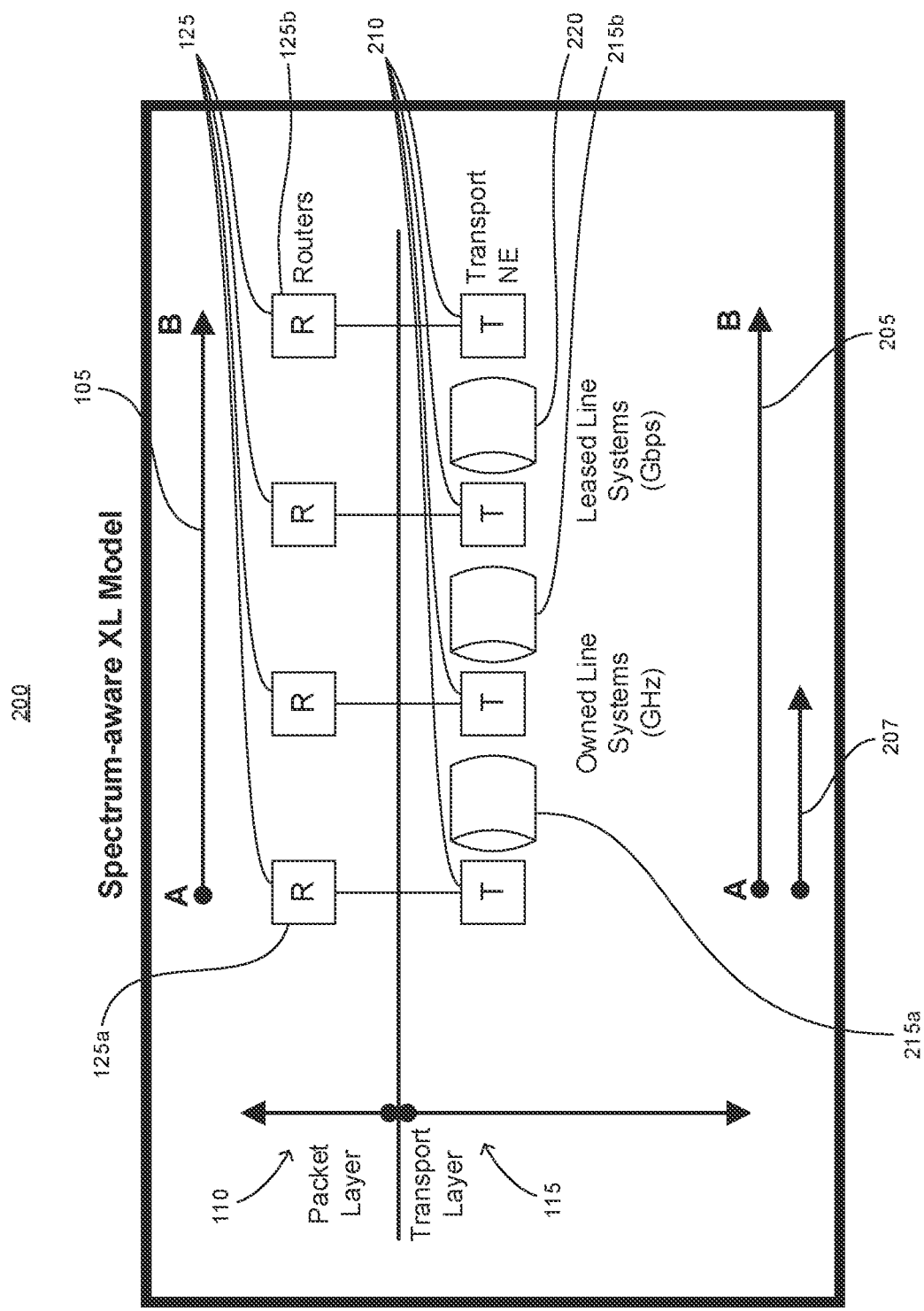
FIG. 2 is a functional block diagram illustrating how a cross-layer optimization model of an embodiment may be used to model a network link.

FIG. 2 is a functional block diagram illustrating how a spectrum aware XL optimization model 200 of an embodiment may be used to model a network link. As can be seen from the figure, a signal on link 105 of the higher level layer 110 of the network may be allocated network resources corresponding to a sublink 205 on the lower level layer 115 of the network 115. The link 105 refers to a communicative coupling between two end points, e.g., endpoints A and B, as seen in the context of the higher level layer 110, and the sublink 205 refers to a communicative coupling between the two endpoints, A and B, as seen in the context of the lower level layer 115. In the depicted example, the link 105 corresponds to a path between routers 125a and 125b, whereas the sublink 205 corresponds to a path that runs through a plurality of transport network elements 210, two owned-line systems 215a and 215b, and one leased line system 220. The owned-line systems 215a and 215b are line systems that are owned by the entity that allocates the network resources, e.g., the network service provider. The leased-line system 220 is not owned by the entity that allocates the network resources and is, for example, leased by the entity that allocates the network resources.

In allocating resources according to model 200, a signal to be conveyed over the network being modeled may be said to be carried by a link in the higher level layer 110. For example, if it is desired to transmit a signal that conveys information at a rate of 300 Gigabits per second (Gbps), the signal may be said to be carried by link 105, with link 105 being able to support the transmission of data between points A and B at a rate of 300 Gbps. Then, once the signal is defined on link 105 of the higher level layer 110, an operation is performed to determine network elements of the lower level layer 115 that can provide a 300 Gbps communicative coupling between routers 125a and 125b. In the example, the elements of the lower level layer 115 that satisfy the requirement of link 105 are referred to collectively as sublink 205. Thus, in the example of FIG. 2, the sublink 205 is able to support the transmission of data between points A and B at a rate of 300 Gbps, and network elements 210, 215a, 215b, and 220 may support the allocation of such communication. That is, in the network to which XL model 200 is applied, network elements 210, 215a, 215b, and 220 may be used to transmit a 300 Gbps signal from point A to point B. In this regard, it should be noted that in general each of the network elements 210, 215a, 215b, and 220 are not exclusively used for transmitting the illustrative 300 Gbps signal, or any other signal, and may be used to transmit multiple signals including the 300 Gbps. Nevertheless, it is also possible that any one or more of network elements 210, 215a, 215b, and 220 are exclusively used for transmitting the illustrative 300 Gbps signal.

A difference between the modeling of FIG. 1 and the modeling of FIG. 2 is the manner in which the owned-line systems are modeled. In FIG. 1, the owned-line systems 135a and 135b are abstracted as couplings that can support given a communication rate, e.g., communication rate expressed in Gbps, whereas in FIG. 2, each of the owned-line systems 215a and 215b are abstracted as couplings that provide a bandwidth capacity, e.g., bandwidth capacity expressed in GHz. Further, in the FIG. 2 model a transmission capacity for each of the owned-line systems 215a and 215b is determined according to the bandwidth capacity of the system and a spectral efficiency for a signal, e.g., an optical signal, deployed across the system, the spectral efficiency being dependent on one or more factors including at least parameters of the owned-line system and the spectral efficiency being expressed as the rate at which information can be transmitted per unit of bandwidth, e.g., as bits per second per hertz (bps/Hz). Moreover, a transmission capacity for the two owned-line systems 215a and 215b, when considered together as a subpath 207, is determined according to the bandwidth capacity of the subpath 207 and a spectral efficiency for a signal, e.g., an optical signal deployed across the subpath 207, the spectral efficiency being dependent on one or more factors including at least parameters of the subpath 207, and the spectral efficiency being expressed as the rate at which information can be transmitted per unit of bandwidth, e.g., as bits per second per hertz (bps/Hz). Thus, for example, if the subpath 207 has a bandwidth capacity of 150 GHz and the spectral efficiency of an optical signal across the subpath is 2 bps/Hz, the transport capacity of the subpath 207 for the optical signal is 150 GHz×2 bps/Hz, or 300 Gbps.

The spectral efficiency for a given optical signal may depend on one or more of the signal modulation, the signal protocol, the technology type of transponders used to relay the signal, the length of lines traversed by the signal, and the type of lines traversed by the signal, although these enumerated factors are merely illustrative and are not presented as an exhaustive list of factors that may affect the spectral efficiency. Moreover, it is noted that the spectral efficiency may be dictated by the minimum signal-to-noise ratio required to successfully transmit the signal over the line system as spectral efficiency may be traded off against signal-to-noise ratio (SNR). For example, higher order modulation formats, that yield higher spectral efficiency, suffer from higher degradation of the SNR, and therefore to meet a minimum SNR requirement it may be necessary to employ a lower order modulation that yields a lower spectral efficiency.

Regarding calculations of transport capacity based on bandwidth capacity and spectral efficiency, it should be noted that such calculations are not limited to calculating a single transport capacity based on a single bandwidth capacity and a single spectral efficiency. One possible alternative is calculating a range of transport capacities based on a bandwidth capacity and a spectral efficiency, with the spectral efficiency being specified as a range of spectral efficiencies to account for a margin of error In any event, transport capacities may be calculated based on bandwidth capacities and spectral efficiencies of the required optical signals, with the bandwidth capacities and the spectral efficiencies being computed for optical signals across specific owned-line systems.

Referring back to FIG. 2, it should be noted that an important distinction between the owned-line systems 215a and 215b and the leased-line system 220 lies in the information available to the network service provider. The service provider has ready access to the information necessary to calculate spectral efficiencies for a given signal, e.g., an optical signal, that traverses the owned-line systems 215a and 215b because the provider owns the owned-line systems 215a and 215b. By contrast, the service provider does not have ready access to the information necessary to calculate the spectral efficiency for a given signal, e.g., an optical signal traverses the leased-line system 220 because the provider does not own the leased-line system 220. Accordingly, since the service provider has ready access to the information necessary to calculate spectral efficiencies for the owned-line systems 215a and 215b, it is possible for the provider to calculate spectral efficiencies for the owned-line systems 215a and 215b and, in turn, calculate the transport capacities of the owned-line systems 215a and 215b based on the spectral efficiencies. Whereas, since the service provider does not have ready access to the information necessary to calculate the spectral efficiency of the leased-line system 220, it is not possible for the service provider to calculate the transport capacity of the leased-line system 220. Rather the service provider must use a default value for the transport capacity of the leased-line system 220. Such default value is generally a broad approximation of the transport capacity of the leased-line system 220, which may be provided by the owner of the leased-line system 220 or may be specified in the lease agreement.

For example, a service provider can deploy an optical signal that spans one or multiple owned-line systems, e.g., owned-line systems 215a and 215b, which will determine the spectral efficiency of the optical signal and the total transport capacity that the owned-line systems can support. That is, the transport capacity of an owned-line system is not assigned a pre-defined Gbps as the Gbps of the system depends on the optical signals deployed on the system. By contrast, the service provider can only deploy an optical signal on a leased-line system, e.g., leased line system 220, without examining spectral efficiency, thereby defining a unique spectral efficiency for the signal across the leased-line system and a unique transport capacity for the leased-line system. Accordingly, it is possible to abstract the leased-line system transport capacity as a Gbps default value. Such default value is generally a broad approximation of the transport capacity of the leased-line system, and may be provided by the owner of the leased-line system or may be specified in the lease agreement.

Another feature of the spectrum-aware XL optimization of the present technology is the ability to allocate contiguous spectrum. To describe the contiguous spectrum aspect, reference is made to FIGS. 3 and 4.

Figure 3:
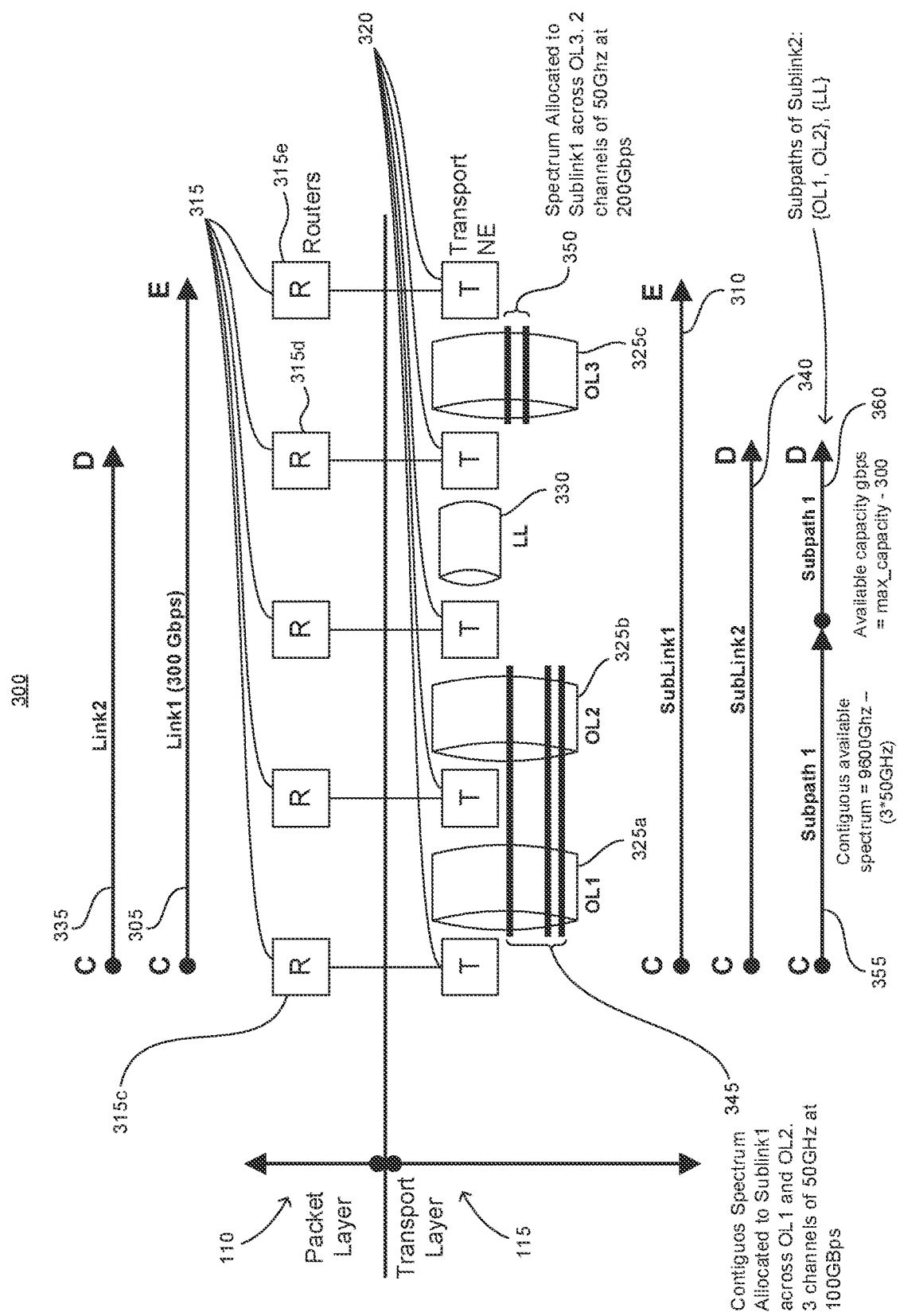
FIGS. 3 and 4 are functional block diagrams illustrating how a cross-layer optimization model may be used to allocate a network resources to convey a signal over the network.
Figure 4:
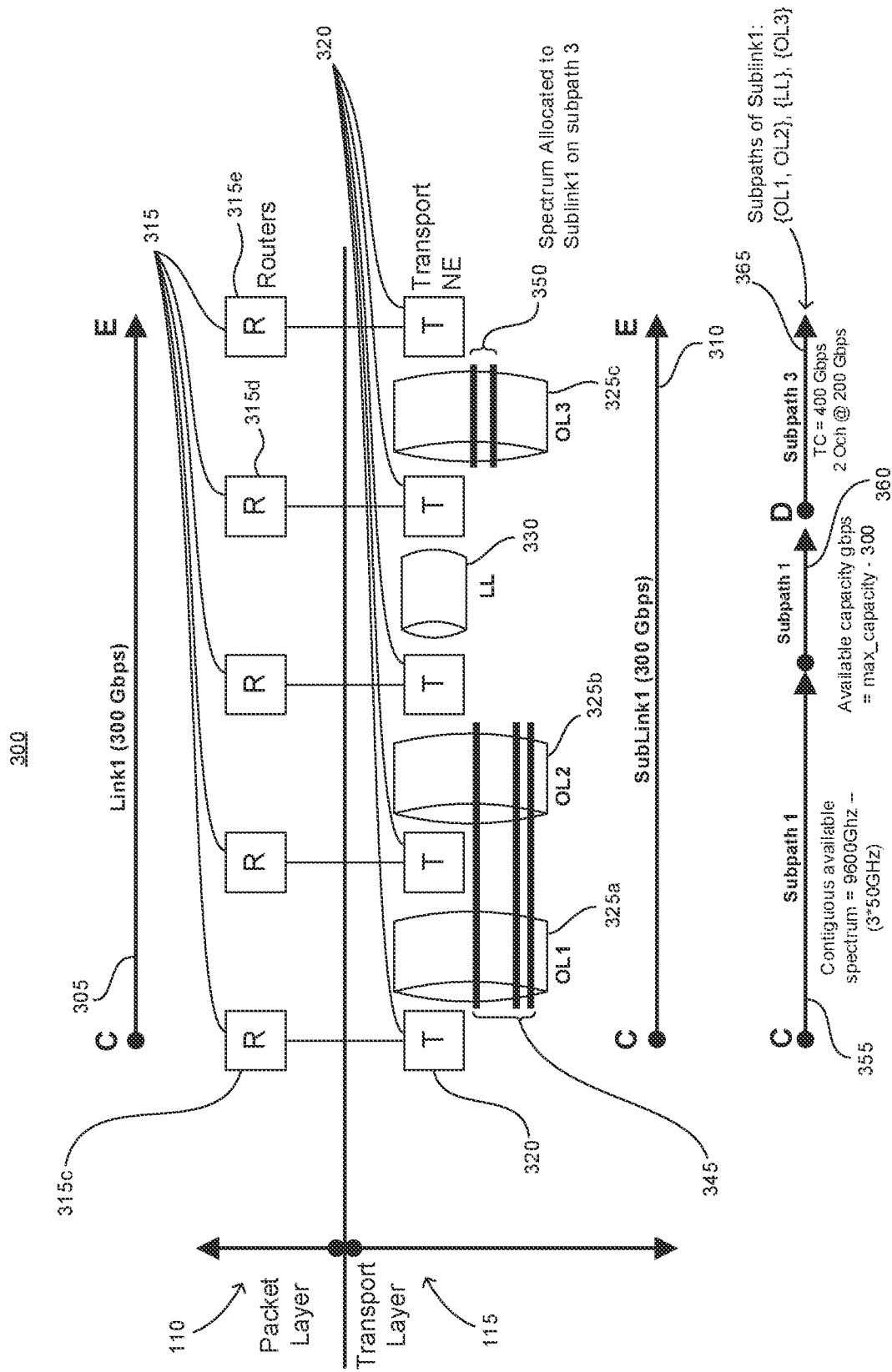

FIGS. 3 and 4 are functional block diagrams illustrating how a spectrum-aware XL optimization model 300 of an embodiment may be used to select network elements for carrying a signal while considering the availability of contiguous spectrum between such elements.

Referring to FIG. 3, the network model 300 is considered at two levels of abstraction, a higher level layer, e.g., packet layer 110, and a lower level layer, e.g., a transport layer 115. A link 305 refers to a communicative coupling between two end points, e.g., endpoints C and E, as seen in the context of the higher level layer 110. A sublink 310 refers to a communicative coupling between the two endpoints, C and E, as seen in the context of the lower level layer 115. In the depicted example, the link 305 corresponds to a direct communicative coupling between routers 315c and 315e of routers 315, whereas the sublink 310 corresponds to a path through multiple transport network elements 320, three owned-line systems 325a, 325b, and 325c, and one leased-line system 330. The three owned-line systems 325a, 325b, and 325c are line systems that are owned by the entity that allocates the network resources, e.g., the network service provider. The leased-line system 330 is not owned by the entity that allocates the network resources and is, for example, leased by the entity that allocates the network resources.

Also depicted in FIG. 3 is a link 335 that corresponds to a direct communicative coupling between routers 315c and 315d of routers 315, and a sublink 340 that corresponds to link 335. The link 335 and sublink 340 refer to a communicative coupling between the endpoint C and an endpoint D, with endpoint D being intermediate between endpoints C and E.

In allocating resources according to model 300, a signal to be conveyed over the network being modeled may be said to be carried by a link in the higher level layer 110. For example, if it is desired to transmit a signal that conveys information at a rate of 300 Gigabits per second (Gbps), the signal may be said to be carried by link 305, with link 305 being able to support the transmission of data between points C and E at a rate of 300 Gbps. Then, once the signal is defined as carried by link 305 on the higher level layer 110, an operation is performed to determine network elements of the lower level layer 115 that can provide a 300 Gbps communicative coupling between points C and E. In the example, the elements of the lower level layer 115 that satisfy the requirement of link 305 are referred to collectively as sublink 310. Thus, in the example of FIG. 3, the sublink 310 is able to support the transmission of data between points C and E at a rate of 300 Gbps, and network elements 320, 325a, 325b, 330, and 325c may support the allocation of such communication. That is, in the network to which uniform model 300 is applied, network elements 320, 325a, 325b, 330, and 325c may be allocated for transmitting a 300 Gbps signal from point C to point E.

Like the modeling described in FIG. 2, the modeling of FIG. 3 abstracts leased-line system as a couplings that can support a given communication rate, e.g., expressed in Gbps, and abstracts owned-line systems as couplings that provide a bandwidth capacity, e.g., expressed in GHz, with the transport capacities for each of the owned-line systems determined according to a spectral efficiency for the owned-line system and a given signal. Moreover, in the FIG. 2 and FIG. 3 models, when multiple owned-line systems are directly coupled, e.g., as in the case of owned-line systems 325a and 325b, the coupled owned-line systems define a subpath, e.g., subpath 355 of FIG. 3, and the spectral efficiency for an optical signal traversing the owned-line systems is a characteristic of the subpath.

A difference between the modeling of FIG. 2 and the modeling of FIG. 3 is that in the FIG. 3 modeling the available frequencies for each owned-line system are specified. By specifying the available frequencies for the owned-line systems, allocations can account for the existence or absence of frequencies that are continuously available between owned-line systems. That is, using the FIG. 3 model, coupling a first owned-line system to a second owned-line system is favored over coupling the first owned-line system to a third owned-line system when both couplings would satisfy signal requirements but the first and second owned-line system have contiguous available frequencies and the first and third owned-line system do not have contiguous available frequencies. Such allocation is advantageous in that it can avoid the recoloring necessary to couple owned-line systems that do not have contiguous frequencies when there exists an alternative coupling of owned-line systems that do have contiguous frequencies. Indeed, in optical networks for example, such recoloring requires costly optical-to-electrical-to-optical (OEO) operations.

The contiguous spectrum aspect of the present technology is illustrated in FIG. 3 in the context of optical channels. The optical channels considered in the figure are 50 GHz wide.

As can be seen from the figure, owned-line systems 325a and 325b are each configured to carry optical channels 50 GHz wide and each of the owned-line systems 325a and 325b have available frequencies corresponding to three optical channels 345. That is, owned-line system 325a carries three optical channels of 50 GHz width each and centered respectively at a first carrier frequency (f1), a second carrier frequency (f2), and a third carrier frequency (f3); and owned-line system 325b carries the same three optical channels of 50 GHz width each and centered respectively at f1, f2, and f3. Also, in each of owned-line systems 325a and 325b, the spectral efficiency for each channel is determined to be 2 bps/Hz, and thus the transport capacity for each channel in each owned-line system is 100 Gbps (50 GHz×2 bps/Hz). Accordingly, the three optical channels 345 have combined transport capacity of 300 Gbps, sufficient to carry the signal traversing link 305, and are therefore allocated to carry the signal. To complete the coupling of point C to point E, the leased-line system 330, having a transport capacity of at least 300 Gbps, and the owned-lined system 325c are allocated. Regarding the owned-line system 325c, the system is configured to carry optical channels 50 GHz wide, but the spectral efficiency of the channels is determined to be 4 bps/Hz, and thus each optical channel of owned-line system 325c has a transport capacity of 200 Gbps (50 GHz×4 bps/Hz). Accordingly, two optical channels 350 of owned-line system 325c are allocated to the signal of link 335 as the two optical channels 350 have an aggregate transport capacity of 400 Gbps, which satisfies the 300 Gbps requirement of the signal, albeit with excess capacity. Moreover, contiguous available frequencies are not considered with respect to owned-line system 325c because owned-line system 325c is not to be couple to another owned-line system.

Also shown in FIG. 3 is an example of elements in the lower level layer 115 supporting multiple signal allocations. As can be seen from the figure, owned-line systems 325a and 325b and leased line system 330 support both the signal carried on link 305 and the signal carried on link 335. Regarding the signal carried on link 335, a sublink 340 refers to a communicative coupling between the two endpoints, C and D, as seen in the context of the lower level layer 115. The sublink 340 has a transport capacity of 300 Gbps, while the owned-line system 325c has a transport capacity of 400 Gbps. Additionally, the sublink 340 may be modeled as including subpath 355 and subpath 360. The subpath 355 includes owned-line system 325a and owned-line system 325b, and has a transport capacity of 300 Gbps (100 Gbps for each one of the three optical channels). The subpath 360 includes leased-line system 360, and has a transport capacity of 300 Gbps.

FIG. 4 shows the subpaths included in the network allocation for the signal carried on sublink 310 of FIG. 3. As can be seen from FIG. 4, sublink 310 is allocated to carry the signal and includes transport network elements 320, owned line systems 325a-c, and leased line system 330. As can be further seen from FIG. 4, the sublink 310 includes three subpaths, subpath 355, subpath 360, and subpath 365. The subpaths 355 and 360 each have transport capacity of 300 Gbps, whereas the subpath 365 has a transport capacity of 400 Gbps because of the allocation of the two optical channels 350. Nevertheless, the sublink 310 has an allocated transport capacity of 300 Gbps since the allocated transport capacity of the sublink 310 is set to the minimum allocated transport capacity of the subpaths 355, 360, and 365 included in the sublink 310.

Figure 5:
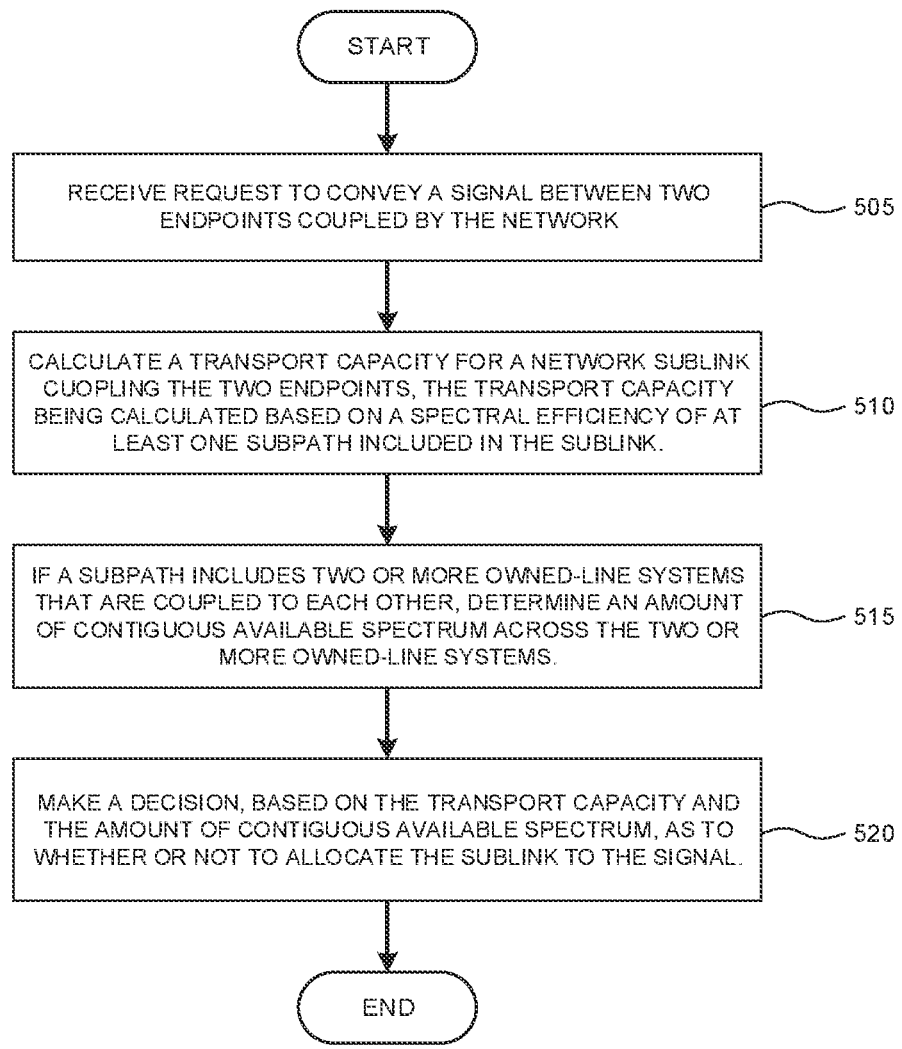
FIG. 5 is a flow chart depicting an operation of allocating network resources to convey a signal over the network.

Turning now to FIG. 5, the figure shows a flow chart depicting an operation of allocating network resources to convey a signal over the network. As can be seen from the figure, upon receipt of a request to convey a signal between two endpoints coupled by the network (step 505), a calculation is performed to calculate a transport capacity for a network sublink coupling the two endpoints, the transport capacity being calculated based on a spectral efficiency of at least one subpath included in the sublink (step 510). Next, if a subpath includes two or more owned-line systems that are coupled to each other, a determination is made as to an amount of contiguous available spectrum across the two or more owned-line systems (step 515), with the understanding that the amount of contiguous available spectrum may be zero. Then, a decision is made, based on the transport capacity and the amount of contiguous available spectrum as to whether or not to allocate the sublink to the signal (step 520). Notably, step 515 is optional, as it is required only for subpaths across owned-line systems and is not required for subpaths across leased-line systems. If the operation is performed without step 515, step 520 is modified so that the decision as to whether or not to allocate the sublink to the signal is based on the transport capacity but not the amount of contiguous available spectrum.

Embodiments of the present technology include, but are not restricted to, the following.

(1) A method for allocating network resources to carry one or more signals that are to be conveyed over the network, including calculating a transport capacity for a sublink of the network based on a spectral efficiency of at least one subpath included in the sublink; and allocating the sublink to at least one signal based on the calculated transport capacity.

(2) The method according to (1), wherein the step of calculating includes calculating a transport capacity for the sublink of the network based on respective spectral efficiencies for two or more subpaths included in the sublink.

(3) The method according to (1), wherein the step of calculating further includes determining an amount of contiguous available spectrum across the subpath.

(4) The method according to (1), wherein the sublink and the at least one subpath reside in a transport layer of the network, and the sublink corresponds to a higher level link that resides in a packet layer of the network.

(5) The method according to (1), wherein the sublink and the at least one subpath reside in the L1 layer of the open systems interconnection (OSI) model of the network, and the sublink corresponds to higher level link that resides in L3 layer of the OSI model of the network.

(6) The method according to (1), wherein the sublink includes at least one subpath owned by an entity that allocates the network resources and at least one subpath not owned by the entity that allocates the network resources, and wherein the step of calculating includes calculating a transport capacity for the sublink of the network based on a spectral efficiency of the at least one subpath owned by the entity that allocates the network resources and on a default transport capacity of the at least one subpath not owned by the entity that allocates the network resources.

(7) The method according to (1), wherein the step of calculating includes calculating a range of transport capacities for the sublink of the network based on a spectral efficiency of at least one subpath included in the sublink, and wherein the step of allocating includes allocating the sublink to the at least one signal based on the calculated range of transport capacities.

(8) The method according to (1), wherein the transport capacity is calculated in terms of bits per second (bps), and the spectral efficiency is calculated in terms of bits per second per hertz (bps/Hz).

(9) The method according to (1), wherein the spectral efficiency is calculated based on at least one or more of a physical characteristic of a transmission line included in the subpath, a transmission protocol implemented on the subpath, or a signal modulation implemented on the subpath.

(10) The method according to (1), wherein the spectral efficiency is calculated based on at least a minimum signal-to-noise ratio required for successfully transmitting a signal on the subpath.

(11) The method according to (1), wherein the sublink is configured to convey optical signals.

(12) The method according to (1), wherein the at least one subpath is configured to convey optical signals.

(13) A network sublink including at least one subpath, the sublink being allocated to convey one or more signals on the network by performing an operation including calculating a transport capacity for the sublink based on a spectral efficiency of the at least one subpath and allocating the sublink to the one or more signals based on the calculated transport capacity.

(14) The network sublink according to (13), wherein calculating a transport capacity for the sublink includes calculating a transport capacity for the sublink based on respective spectral efficiencies for two or more subpaths included in the sublink.

(15) The network sublink according to (13), wherein calculating a transport capacity further includes determining an amount of contiguous available spectrum across the subpath.

(16) The network sublink according to (13), wherein the sublink includes at least one subpath owned by an entity that allocates the network resources and at least one subpath not owned by the entity that allocates the network resources, and wherein calculating includes calculating a transport capacity for the sublink based on a spectral efficiency of the at least one subpath owned by the entity that allocates the network resources and on a default transport capacity of the at least one subpath not owned by the entity that allocates the network resources.

(17) The network sublink according to (13), wherein calculating a transport capacity for the sublink includes calculating a range of transport capacities for the sublink based on a spectral efficiency of at least one subpath included in the sublink, and wherein allocating the sublink to the one or more signals includes allocating the sublink to the one or more signals based on the calculated range of transport capacities.

(18) The network sublink according to (13), wherein the spectral efficiency is calculated based on at least one or more of a physical characteristic of a transmission line included in the subpath, a transmission protocol implemented on the subpath, or a signal modulation implemented on the subpath.

(19) The network sublink according to (13), wherein the spectral efficiency is calculated based on at least a minimum signal-to-noise ratio required for successfully transmitting a signal on the subpath.

(20) A non-transitory computer-readable medium having stored thereon a computer-readable program for performing a method for allocating network resources to convey one or more signals that are to be transmitted over the network, the method including calculating a transport capacity for at least one sublink of the network based on a spectral efficiency of at least one subpath included in the sublink; and allocating the sublink to at least one signal based on the calculated transport capacity.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A method for allocating network resources to one or more signals that are to be conveyed over the network, comprising:
calculating a transport capacity for a sublink of the network based on a spectral efficiency of at least one subpath included in the sublink; and
allocating the sublink to at least one signal based on the calculated transport capacity,
wherein the sublink comprises at least one subpath owned by an entity that allocates the network resources and at least one subpath not owned by the entity that allocates the network resources, and wherein the step of calculating comprises calculating a transport capacity for the sublink of the network based on a spectral efficiency of the at least one subpath owned by the entity that allocates the network resources and on a default transport capacity of the at least one subpath not owned by the entity that allocates the network resources.

2. The method according to claim 1, wherein the step of calculating comprises calculating a transport capacity for the sublink of the network based on respective spectral efficiencies for two or more subpaths included in the sublink.

3. The method according to claim 1, wherein the step of calculating further comprises determining an amount of contiguous available spectrum across the subpath owned by the entity that allocates the network resources.

4. The method according to claim 1, wherein the sublink resides in a transport layer of the network, and the sublink corresponds to a higher level link that resides in a packet layer of the network.

5. The method according to claim 1, wherein the sublink resides in the L1 layer of the open systems interconnection (OSI) model of the network, and the sublink corresponds to higher level link that resides in L3 layer of the OSI model of the network.

6. The method according to claim 1, wherein the step of calculating comprises calculating a range of transport capacities for the sublink of the network based on a spectral efficiency of the subpath owned by the entity that allocates the network resources, and wherein the step of allocating comprises allocating the sublink to the at least one signal based on the calculated range of transport capacities.

7. The method according to claim 1, wherein the transport capacity is calculated in terms of bits per second (bps), and the spectral efficiency is calculated in terms of bits per second per hertz (bps/Hz).

8. The method according to claim 1, wherein the spectral efficiency is calculated based on at least one or more of a physical characteristic of a transmission line included in the subpath owned by the entity that allocates the network resources, a transmission protocol implemented on the subpath owned by the entity that allocates the network resources, or a signal modulation implemented on the subpath owned by the entity that allocates the network resources.

9. The method according to claim 1, wherein the spectral efficiency is calculated based on at least a minimum signal-to-noise ratio required for successfully transmitting a signal on the subpath owned by the entity that allocates the network resources.

10. The method according to claim 1, wherein the sublink is configured to convey optical signals.

11. The method according to claim 1, wherein the subpath owned by the entity that allocates the network resources is configured to convey optical signals.

12. A network sublink comprising at least one subpath, the sublink being allocated to convey one or more signals on the network by performing an operation comprising calculating a transport capacity for the sublink based on a spectral efficiency of the at least one subpath and allocating the sublink to the one or more signals based on the calculated transport capacity, wherein the sublink comprises at least one subpath owned by an entity that allocates the network resources and at least one subpath not owned by the entity that allocates the network resources, and wherein calculating comprises calculating a transport capacity for the sublink based on a spectral efficiency of the at least one subpath owned by the entity that allocates the network resources and on a default transport capacity of the at least one subpath not owned by the entity that allocates the network resources.

13. The network sublink according to claim 12, wherein calculating a transport capacity for the sublink comprises calculating a transport capacity for the sublink based on respective spectral efficiencies for two or more subpaths included in the sublink.

14. The network sublink according to claim 12, wherein calculating a transport capacity further comprises determining an amount of contiguous available spectrum across the subpath owned by the entity that allocates the network resources.

15. The network sublink according to claim 12, wherein calculating a transport capacity for the sublink comprises calculating a range of transport capacities for the sublink based on a spectral efficiency of the subpath owned by the entity that allocates the network resources, and wherein allocating the sublink to the one or more signals comprises allocating the sublink to the one or more signals based on the calculated range of transport capacities.

16. The network sublink according to claim 12, wherein the spectral efficiency is calculated based on at least one or more of a physical characteristic of a transmission line included in the subpath owned by the entity that allocates the network resources, a transmission protocol implemented on the subpath owned by the entity that allocates the network resources, or a signal modulation implemented on the subpath owned by the entity that allocates the network resources.

17. The network sublink according to claim 12, wherein the spectral efficiency is calculated based on at least a minimum signal-to-noise ratio required for successfully transmitting a signal on the subpath owned by the entity that allocates the network resources.

18. A non-transitory computer-readable medium having stored thereon a computer-readable program for performing a method for allocating network resources to convey one or more signals that are to be transmitted over the network, the method comprising:
- calculating a transport capacity for at least one sublink of the network based on a spectral efficiency of at least one subpath included in the sublink; and
- allocating the sublink to at least one signal based on the calculated transport capacity,
- wherein the sublink comprises at least one subpath owned by an entity that allocates the network resources and at least one subpath not owned by the entity that allocates the network resources, and wherein the step of calculating comprises calculating a transport capacity for the sublink of the network based on a spectral efficiency of the at least one subpath owned by the entity that allocates the network resources and on a default transport capacity of the at least one subpath not owned by the entity that allocates the network resources.

* * * * *